(12) United States Patent
Kwak et al.

(10) Patent No.: US 12,311,788 B2
(45) Date of Patent: May 27, 2025

(54) CHARGE PORT DOOR

(71) Applicant: SL Corporation, Daegu (KR)

(72) Inventors: Daehee Kwak, Gyeongsan-si (KR);
Taewon Park, Gyeongsan-si (KR);
Mansoo Heo, Gyeongsan-si (KR)

(73) Assignee: SL Corporation, Daegu (KR)

( * ) Notice: Subject to any disclaimer, the term of this patent is extended or adjusted under 35 U.S.C. 154(b) by 729 days.

(21) Appl. No.: 17/586,130

(22) Filed: Jan. 27, 2022

(65) Prior Publication Data

US 2022/0305924 A1    Sep. 29, 2022

(30) Foreign Application Priority Data

Mar. 25, 2021  (KR) .................. 10-2021-0039041

(51) Int. Cl.
*B60L 53/16*      (2019.01)
*B60K 15/05*     (2006.01)

(52) U.S. Cl.
CPC .............. *B60L 53/16* (2019.02); *B60K 15/05* (2013.01); *B60K 2015/053* (2013.01); *B60K 2015/0538* (2013.01)

(58) Field of Classification Search
CPC ... B60L 53/16; B60K 15/05; B60K 2015/053; B60K 2015/0538
USPC ....................................................... 320/107
See application file for complete search history.

(56) References Cited

U.S. PATENT DOCUMENTS

2013/0076059 A1*  3/2013  Zalan ................ B60L 53/16
                                                              49/386

FOREIGN PATENT DOCUMENTS

| CN | 103904722 A | * | 7/2014 | .......... B60L 11/1809 |
| CN | 104375634 A | * | 2/2015 | ............. B60K 15/05 |
| CN | 109641550 A | * | 4/2019 | ............. B60K 15/05 |

OTHER PUBLICATIONS

CN-109641550-A (Ueno et al.) (Apr. 15, 2019) (Machine Translation) (Year: 2019).*

* cited by examiner

*Primary Examiner* — Mahmoud Gimie
(74) *Attorney, Agent, or Firm* — United One Law Group LLC; Kongsik Kim; Jhongwoo Peck

(57) ABSTRACT

A charging port door is provided. The charging port door includes a door panel for opening and closing a charging housing that accommodates a charging port therein, an optical unit included within the door panel for irradiating light to an exterior of the door panel, and a controller for controlling the optical unit. In particular, the controller is configured to control the optical unit in response to a predetermined condition being satisfied, the predetermined condition including at least one of open/closed status of the door panel, charging status, driving state, detection of a driver, or detection of a motion of an external object.

17 Claims, 14 Drawing Sheets

CHARGE PORT DOOR

CROSS-REFERENCE TO RELATED APPLICATION

This application claims priority to Korean Patent Application No. 10-2021-0039041 filed on Mar. 25, 2021, which is incorporated herein by reference in its entirety.

BACKGROUND

1. Technical Field

The present disclosure relates to a charging port door, and more particularly, to a charging port door that outputs a lighting pattern on a surface thereof.

2. Description of the Related Art

An electric vehicle or hybrid vehicle that includes a motor and a battery to generate a driving force with electric power has a charging port configured for charging the battery. The charging port may be provided on one side of the vehicle, and may be sealed or covered by a charging port door. When the charging port door is opened, the charging port is exposed to the exterior, and when the charging port door is closed, the charging port can be protected from the external elements.

SUMMARY

An aspect of the present disclosure provides a charging port door that outputs a lighting pattern on a surface thereof.

The present disclosure is not limited to solving the problems mentioned above, and other objects will also be clearly understood by those skilled in the art from the following descriptions.

In order to achieve the above object, a charging port door according to an exemplary embodiment of the present disclosure may include a door panel for opening and closing a charging housing that accommodates a charging port therein, an optical unit included within the door panel for irradiating light to an exterior of the door panel, and a controller configured to control the optical unit. In particular, the controller may be configured to control the optical unit in response to a predetermined condition being satisfied. The predetermined condition may include at least one of open/closed status of the door panel, charging status, driving state of a vehicle, detection of an external object, or detection of a motion of an external object.

The door panel may include a main panel for providing an accommodating space for the optical unit, and a panel cover coupled to the main panel. The panel cover may seal the accommodating space for the optical unit, and transmit the light from the optical unit to form a predetermined light pattern. Accordingly, the panel cover may include a cover body including a substantially transparent material, a paint layer disposed on a surface of the cover body, and a coating layer formed by applying a transparent coating material on a surface of the paint layer. The paint layer may include a preset light transmission pattern.

The optical unit may include a light source for irradiating the light, and a light guide configured for guiding the light from the light source to the exterior of the door panel.

The light guide may include a first light guide for diffusing the light incident from the light source, and a second light guide for emitting the light incident from the first light guide in a preset pattern.

The first light guide may include an incident surface for receiving the light from the light source, a reflective surface for reflecting the light incident from the light source, and an emitting surface for emitting the light reflected by the reflective surface. The reflective surface may be formed to be inclined with respect to an optical axis of the light source. The emitting surface may be formed by micro-processing. The first light guide may include one or more diffuse reflecting feature for diffuse reflecting the light incident from the light source, and the diffuse reflecting feature may include a spherical surface. The first light guide may include a plurality of diffuse reflecting features, and the plurality of diffuse reflecting features may be formed in the first light guide in a preset pattern. In some embodiments, the first light guide may include a plurality of diffuse reflecting features, and at least some of the plurality of diffuse reflecting features may exhibit different sizes.

The second light guide may include one or more total reflecting feature for reflecting the light incident from the first light guide, and the total reflecting feature may be formed in the second light guide so that a local reflective surface of the total reflecting feature may be inclined with respect to a light emitting surface of the second light guide. The second light guide may include a plurality of total reflecting features, and the plurality of total reflecting features may be formed in the second light guide in a preset pattern.

Further, the charging port door may include a motion detector for detecting the motion of the external object present, if any, outside the door panel.

The optical unit may include a plurality of light sources, and the controller may be configured to control the plurality of light sources to be turned on or turned off in a pattern corresponding to different motions of the external object.

The charging port door may further include an actuator for generating a driving force for opening and closing the door panel, and the controller may be configured to control the actuator based on the motion of the external object.

Further, the optical unit may include a plurality of light sources, and the controller may be configured to control the plurality of light sources to be turned on or turned off in a preset pattern.

With the charging port door according to exemplary embodiments of the present disclosure as described above, the visibility may be improved due to a lighting pattern output on the door surface, and the brand recognition may be enhanced.

The effects of the present disclosure are not limited to those mentioned above, and other effects will also be clearly understood by those skilled in the art from the disclosure.

BRIEF DESCRIPTION OF THE DRAWINGS

These and/or other aspects will become apparent and more readily appreciated from the following description of exemplary embodiments, taken in conjunction with the accompanying drawings in which:

FIG. 14 depicts an operation example according to an exemplary embodiment of the present disclosure where a plurality of light sources are sequentially turned on.

DETAILED DESCRIPTION

Figure 1:
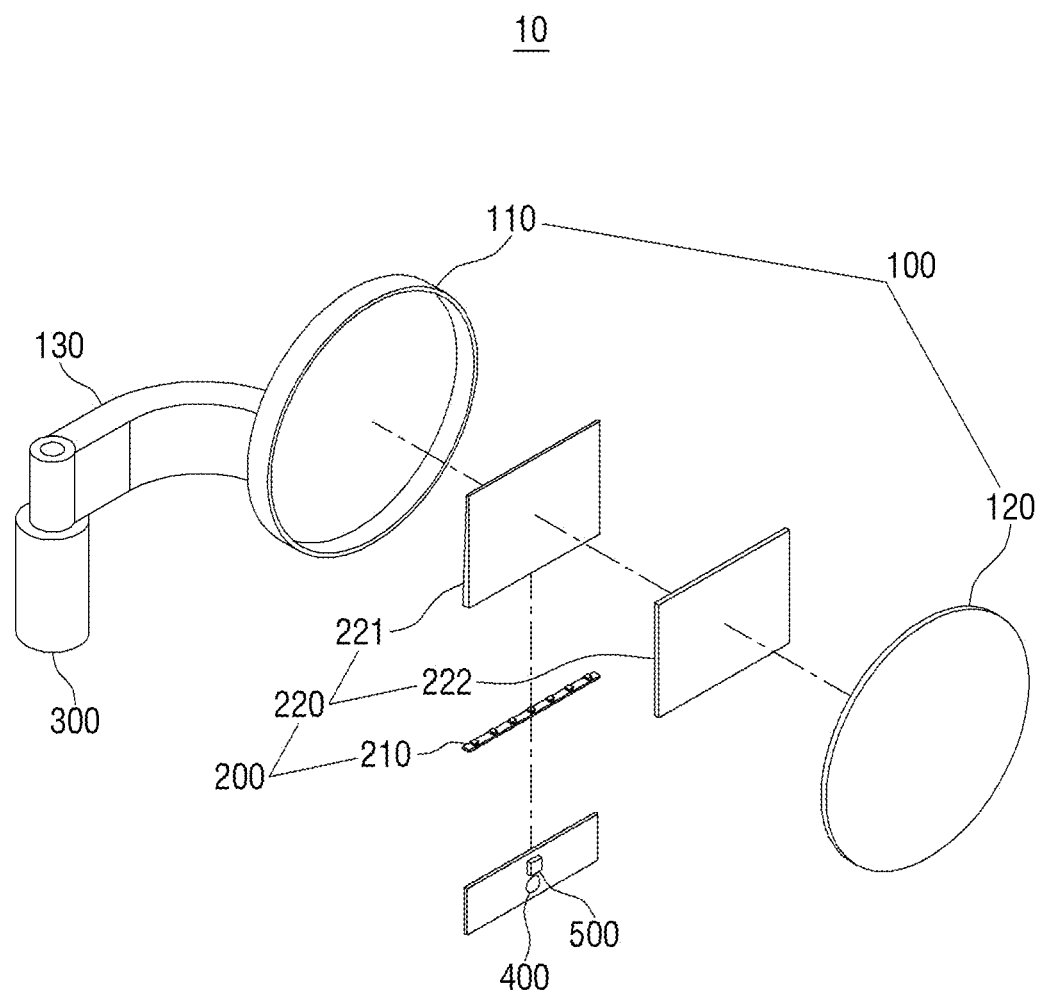
FIG. 1 is an exploded perspective view of a charging port door according to an exemplary embodiment of the present disclosure.

Hereinafter, exemplary embodiments of the present disclosure will be described in detail with reference to the accompanying drawings. Advantages and features of the present disclosure, and means for achieving them will be apparent with reference to the exemplary embodiments described below in detail together with the accompanying drawings. However, the present disclosure is not limited to the exemplary embodiments to be described below, but may be implemented in various different forms, and these exemplary embodiments are only provided to make the disclosures complete, and to fully inform the scope of the disclosure to those of ordinary skill in the technical field to which the present disclosure pertains. Further, the present disclosure is only defined by the scope of the claims. Same reference numerals refer to the same components throughout the specification.

Unless otherwise defined, all terms (including technical and scientific terms) used in the present specification may be used as meanings that can be commonly understood by those of ordinary skill in the art to which the present disclosure pertains. In addition, terms defined in dictionaries should not be interpreted too ideally or excessively unless explicitly specified.

Figure 2:
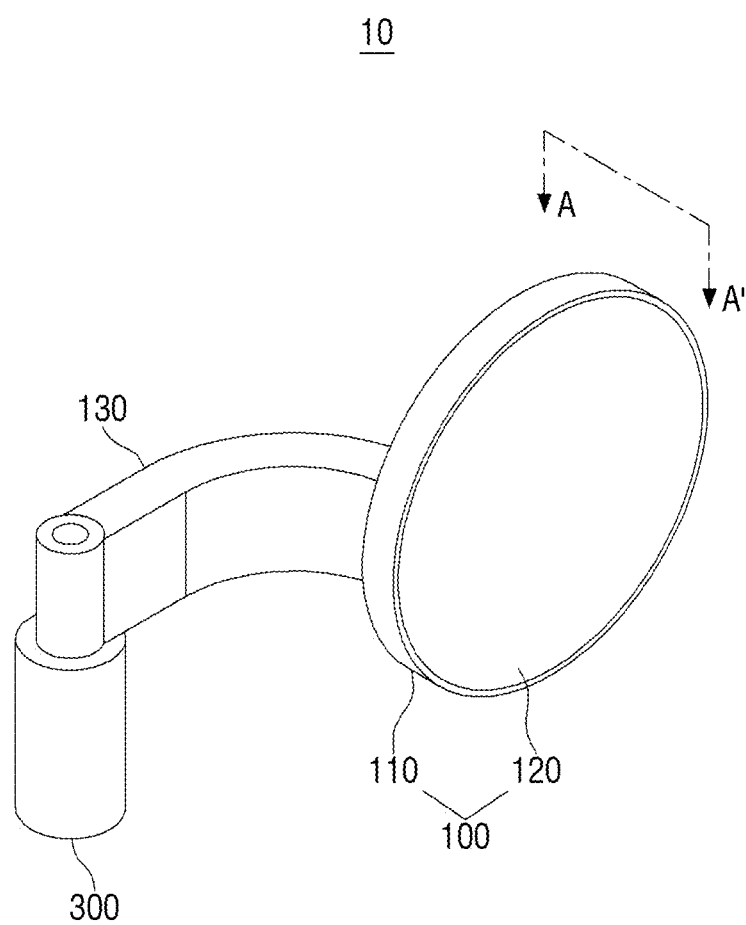
FIG. 2 is a perspective view of a charging port door according to an exemplary embodiment of the present disclosure.
Figure 3:
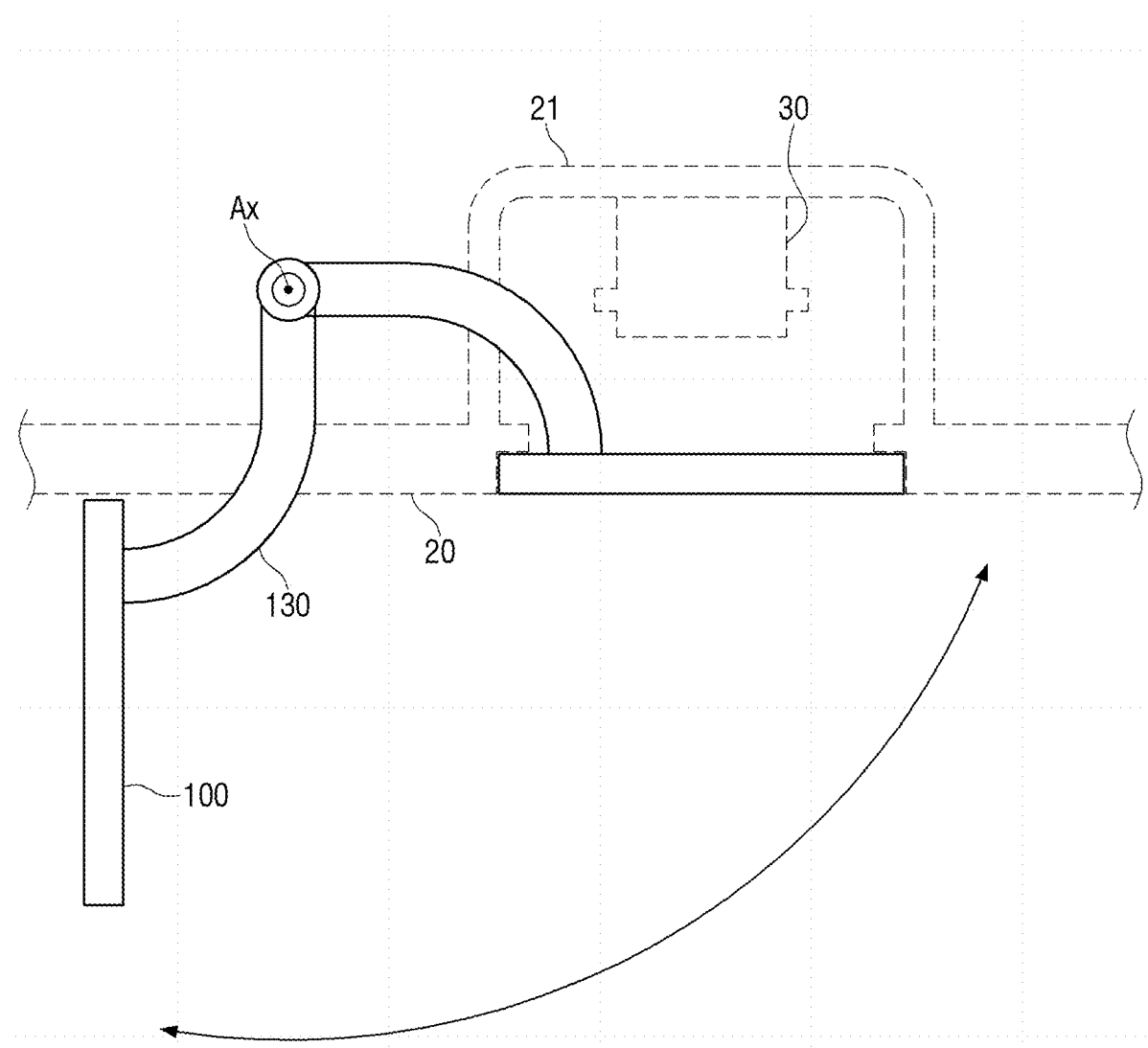
FIG. 3 schematically describes the opening and closing operation of the charging port door according to an exemplary embodiment of the present disclosure.
Figure 4:
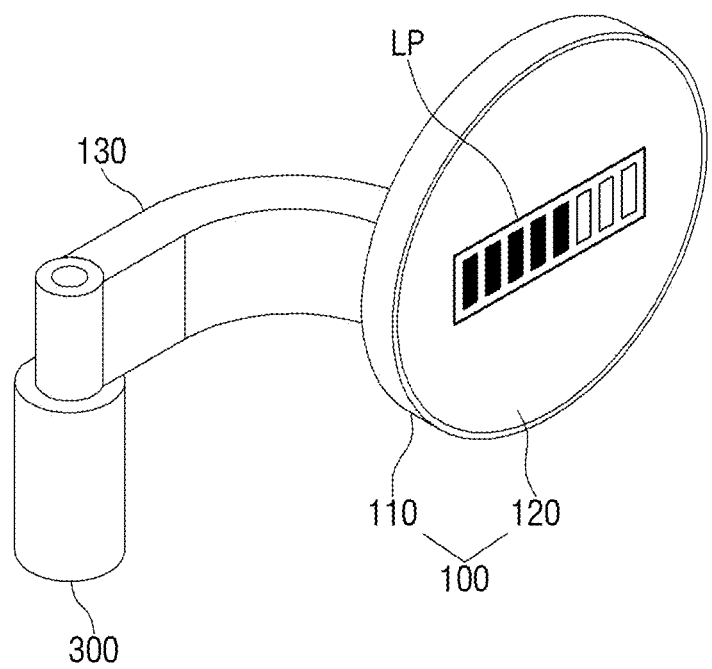
FIG. 4 shows an example of a light pattern formed on the panel cover according to an exemplary embodiment of the present disclosure.
Figure 5:
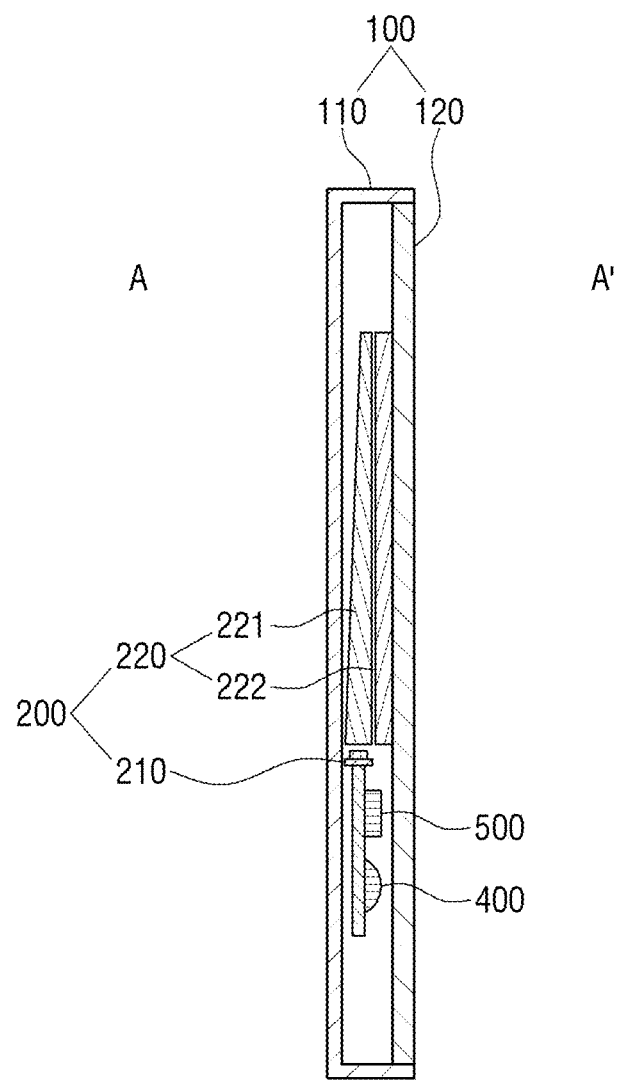
FIG. 5 is a cross-sectional view taken along line A-A' of FIG. 2.

FIG. 1 is an exploded perspective view of a charging port door according to an exemplary embodiment of the present disclosure, FIG. 2 is a perspective view of a charging port door according to an exemplary embodiment of the present disclosure, FIG. 3 schematically describes the opening and closing operation of the charging port door, FIG. 4 shows an example of a light pattern formed on the panel cover, and FIG. 5 is a cross-sectional view taken along line A-A' of FIG. 2.

Referring to FIGS. 1 and 2, a charging port door 10 may include a door panel 100, an optical unit 200, an actuator 300, a motion detector 400, and a controller 500.

Referring to FIG. 3, a vehicle 20 may include a charging port 30 accommodated within a charging housing 21. For example, a hybrid vehicle or an electric vehicle may include the charging port 30 for charging a battery. A door panel 100 may open and close with respect to the charging housing 21 that accommodates the charging port 30. The charging housing 21 that accommodates the charging port 30 may be provided on one side of the vehicle 20, and the door panel 100 may open and close the charging housing 21. When the door panel 100 is opened, the charging port 30 may be exposed to the exterior, and when the door panel 100 is closed, the charging port 30 may be sealed by the combination of the charging housing 21 and the door panel 100.

For the opening and closing operation of the door panel 100, a door arm 130 may be coupled to the door panel 100. A proximal end of the door arm 130 may be rotatably coupled to the vehicle 20, and a distal end thereof may be coupled to the door panel 10. The door panel 100 may open or close the charging housing 21 by rotating the door arm 130 with respect to the rotation axis Ax. Although not shown, the door arm 130 may include a power cable for supplying power to a light source 210 to be described below, the motion detector 400, and the controller 500. The light source 210, the motion detector 400, and the controller 500 may operate with the power supplied through the power cable. The power cable may be embedded within the door arm 130 or may be disposed adjacent to the outer surface of the door arm 130.

The power supplied to the light source 210, the motion detector 400, and the controller 500 may be supplied from the battery that may be charged through the charging port 30. The battery may supply the power to the light source 210, the motion detector 400, and the controller 500 while supplying power to the motor for driving the vehicle.

Referring back to FIGS. 1 and 2, the door panel 100 may include a main panel 110 and a panel cover 120. The main panel 110 may provide an accommodating space for an optical unit 200. The panel cover 120 may be coupled to the main panel 110 to seal the accommodating space for the optical unit 200. The main panel 110 may include an opening at one side. The panel cover 120 may be coupled to the opening of the main panel 110 to seal the accommodating space of the main panel 110.

In addition, the panel cover 120 may transmit the light generated from the optical unit 200 to form the light pattern LP. Referring to FIG. 4, the light pattern LP may be formed on an outer surface of the panel cover 120 by the light irradiated from the optical unit 200 and transmitted through the panel cover 120. Although FIG. 4 shows an example where the light pattern LP indicates the state of charge of the battery, this is merely an example, and the light pattern LP may include an open/closed state of the door panel 100, a driver welcome signal, detection of motion of an external object, or the like. A detailed structure of the panel cover 120 will be described later below with reference to FIG. 6.

Referring again to FIGS. 1 and 2, the optical unit 200 may be provided in the door panel 100 to irradiate light to the exterior of the door panel 100. The optical unit 200 may include one or more light source 210 and a light guide 220. The light source 210 may irradiate light. The light source 210 may include a light emitting module that generates the light, and may be implemented as a light emitting diode (LED), a laser, a bulb type light source, or the like. The light guide 220 may guide the light generated from the light source 210 to the exterior of the door panel 100. For example, the light guide 220 may guide the light from the light source 210 to the panel cover 120. The light guide 220 may include a light transmitting material.

The light guide 220 may include a first light guide 221 and a second light guide 222. The first light guide 221 may diffuse the light incident from the light source 210, and the second light guide 222 may emit the light incident from the first light guide 221 in a preset pattern. As the light emitted from the second light guide 222 transmits through the panel cover 120, the light pattern LP may be formed. Detailed structures of the first light guide 221 and the second light guide 222 will be described later below with reference to FIGS. 7 to 10.

The actuator 300 may generate a driving force for opening and closing the door panel 100. For example, the actuator 300 may be coupled to the door arm 130 to provide a rotational force (e.g., a torque) to the door arm 130 so that the door panel 100 may be opened and closed. Hereinafter, an example where the charging port door 10 includes an actuator 300 will be described, but the present disclosure is not limited to such a configuration. In some embodiments of the present disclosure, the charging port door 10 may include no actuator. In such case, the door panel 100 may be manually opened and closed.

The motion detector 400 may detect a motion of an object present, if any, outside the door panel 100. For example, the motion detector 400 may detect the motion of an external object based on a change in an electric field and/or a magnetic field formed adjacent to the door panel 100. Alternatively, the motion detector 400 may capture one or more images of the exterior of the door panel 100 to detect the motion of an external object based on the captured image, or transmit an ultrasonic wave to the exterior of the door panel 100 to detect the motion of an external object by receiving the reflected wave, which is reflected by the external object. However, the present disclosure is not limited thereto, and any motion detection technologies known in the art may be utilized as the motion detector 400.

The controller 500 may be configured to control the optical unit 200. In the present disclosure, the optical unit 200 may include a plurality of light sources 210. The controller 500 may be configured to individually control each of the plurality of light sources 210. For example, the controller 500 may be configured to control the plurality of light sources 210 to be turned on or off in a preset pattern. A detailed description of the operation of the plurality of light sources 210 will be described later below with reference to FIGS. 13 and 14.

Further, the controller 500 may be configured to control the actuator 300. The actuator 300 may open and close the door panel 100 by generating a driving force based on a control command from the controller 500. The controller 500 may also be configured to control the light source 210 and the actuator 300 with reference to the motion of the external object detected by the motion detector 400. For example, the controller 500 may be configured to control the plurality of light sources 210 to be turned on or off in a pattern corresponding to different motions of the external object.

Referring to FIG. 5, the light source 210, the first light guide 221, the second light guide 222, the motion detector 400, and the controller 500 may be accommodated in the accommodating space of the door panel 100.

According to exemplary embodiments of the present disclosure, the door panel 100 may include a wide surface and may be provided in a substantially flat shape. Accordingly, the accommodating space in by the door panel 100 may also have a substantially flat shape. The light source 210, the first light guide 221, the second light guide 222, the motion detector 400, and the controller 500 may have a shape and size that may be securely accommodated in the accommodating space of the door panel 100, which may enable the implementation of the compact door panel 100.

FIG. 5 shows that the optical unit 200 may be provided on the upper side of the accommodating space of the door panel 100, but this configuration is merely exemplary, and according to some embodiments of the present disclosure, the optical unit 200 may be disposed on the left, right, or lower side of the accommodating space when viewed from the front side of the door panel 100. In addition, a plurality of optical units 200 may be included in the door panel 100, and the same or different light patterns may be formed by the plurality of optical units 200.

Figure 6:
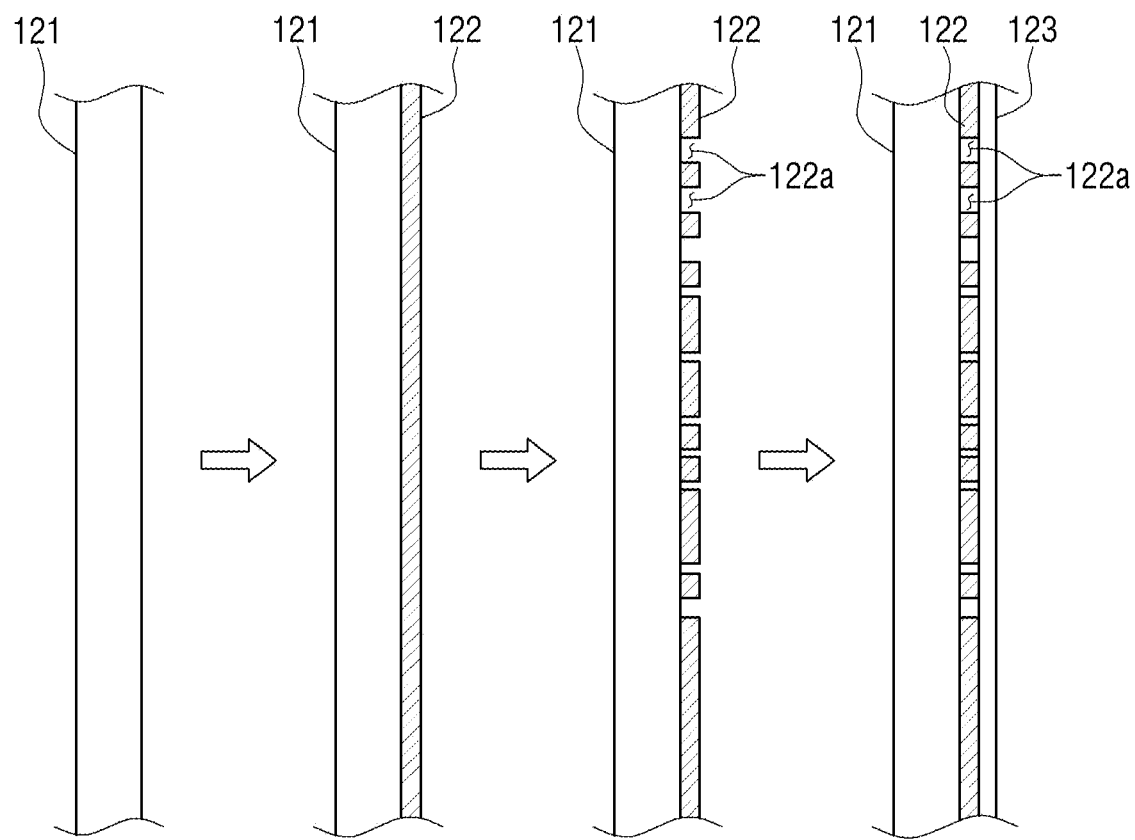
FIG. 6 schematically shows the structure of the panel cover according to an exemplary embodiment of the present disclosure.

FIG. 6 describes the fabrication of the structure of the panel cover. Referring to FIG. 6, the panel cover 120 may include a cover body 121, a paint layer 122, and a coating layer 123.

The cover body 121 may include a substantially transparent or translucent material. Accordingly, the cover body 121 may transmit the light irradiated from the optical unit 200.

The paint layer 122 may be formed by applying a paint to a surface of the cover body 121. The paint may be the same paint as that applied to the exterior surface of the vehicle 20. For example, the paint layer 122 may block the light irradiated from the optical unit 200 or transmit some portion thereof. To transmit some portion of the light, the paint layer 122 may include a preset light transmission pattern 122a. After the paint layer 122 is formed on the cover body 121, a process of forming the light transmission pattern 122a may be performed. The light transmission pattern 122a may be formed by removing at least some portion of the paint layer 122. For example, the light transmission pattern 122a may be formed by a laser engraving process. However, the present disclosure is not limited thereto, and the light transmission pattern 122a may be formed with various other techniques including, but not limited to, chemical or mechanical etching, stencil printing, or the like. Due to the light transmission pattern 122a, the light pattern LP corresponding to the light transmission pattern 122a may be displayed outside of the door panel 100.

The coating layer 123 may be formed by applying a transparent coating material to a surface of the paint layer 122. The coating layer 123 may transmit the light emitted through the light transmission pattern 122a to the exterior. The coating layer 123 may be implemented as the same coating layer as that applied to the exterior surface of the vehicle 20.

Figure 7:
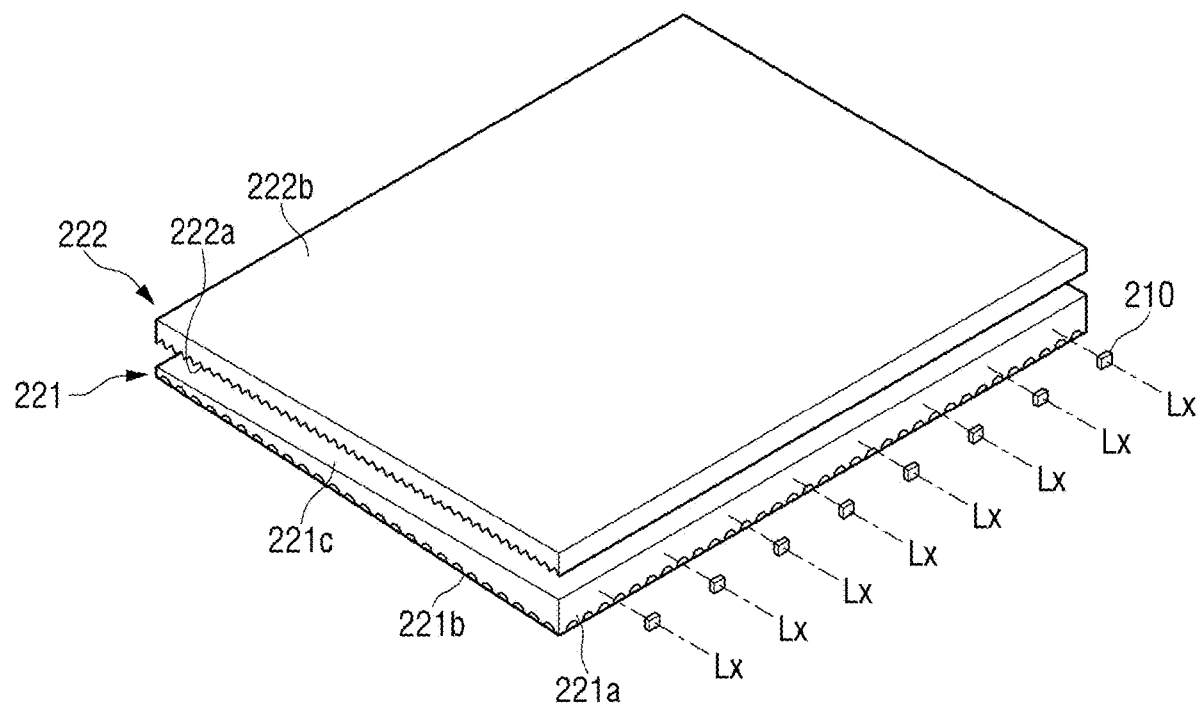
FIG. 7 is a perspective view of the optical unit according to an exemplary embodiment of the present disclosure.
Figure 8:
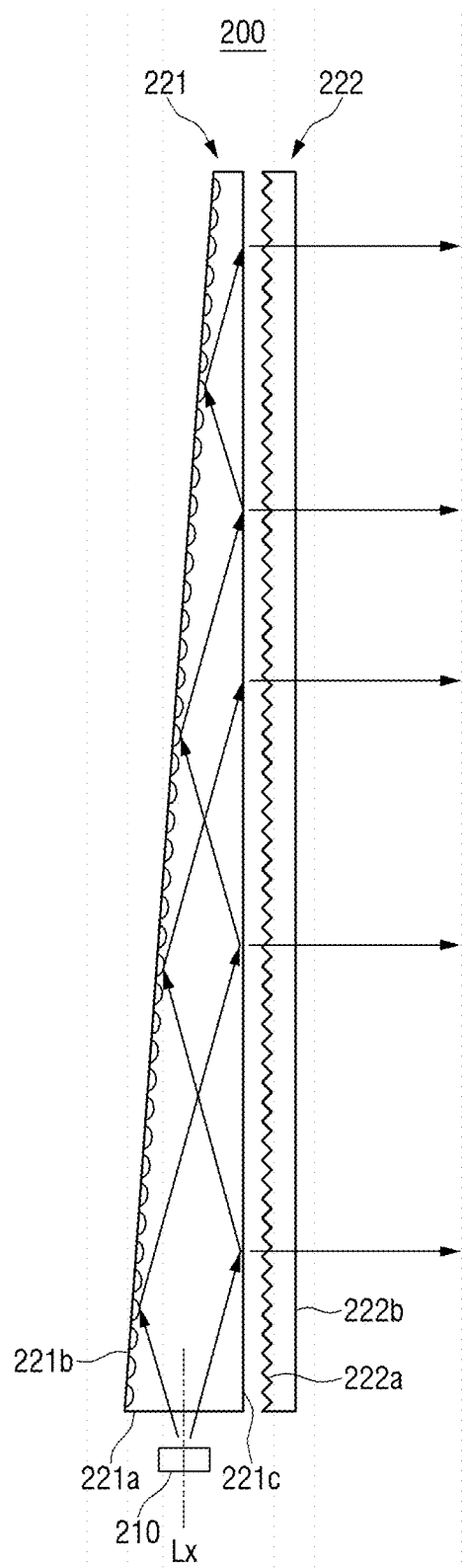
FIG. 8 schematically describes the operation of the optical unit according to an exemplary embodiment of the present disclosure.
Figure 9:
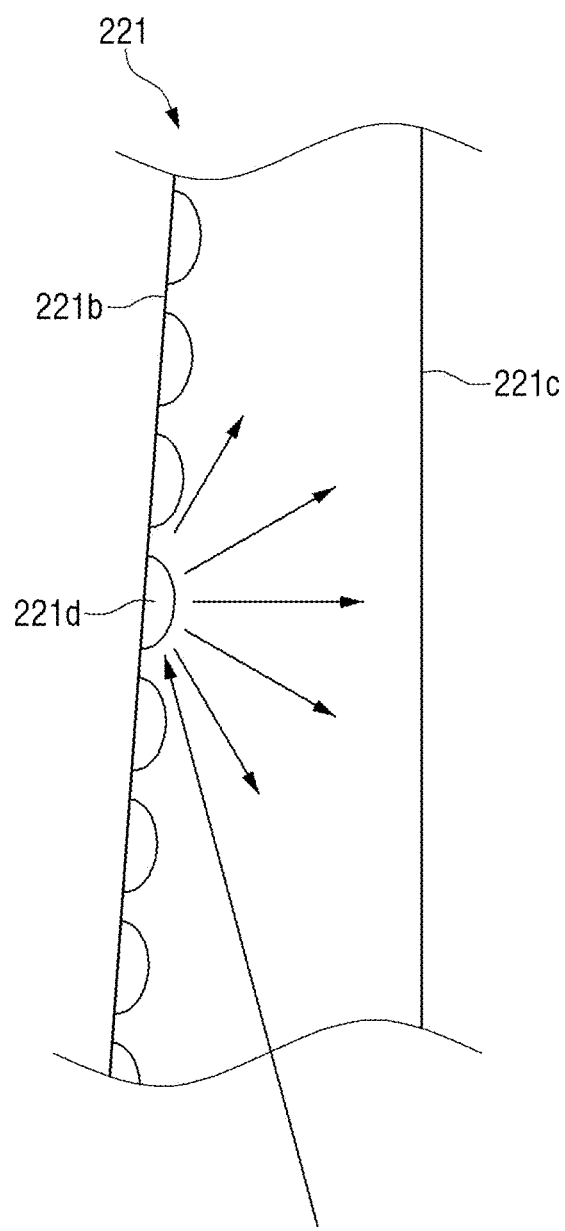
FIG. 9 schematically describes the first light guide according to an exemplary embodiment of the present disclosure.
Figure 10:
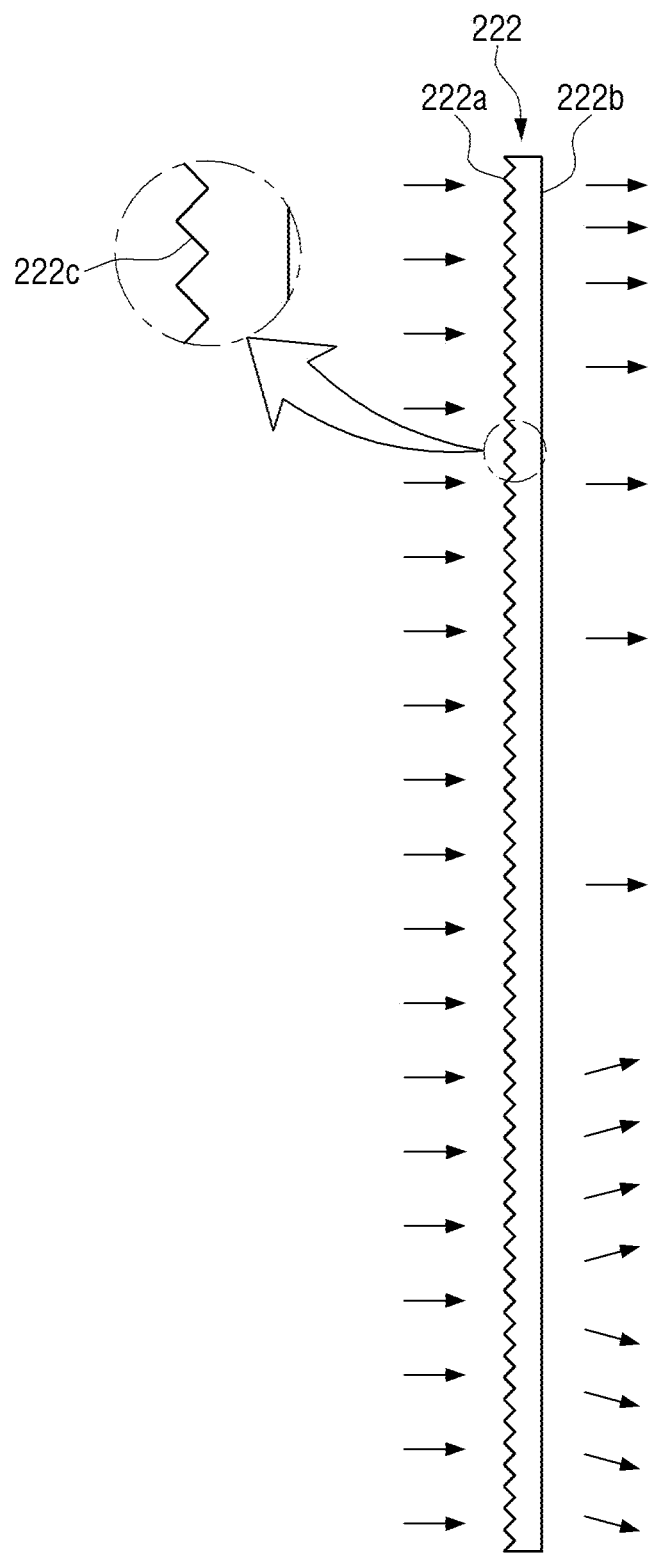
FIG. 10 schematically describes the second light guide according to an exemplary embodiment of the present disclosure.

FIG. 7 is a perspective view of the optical unit, FIG. 8 describes the operation of the optical unit, FIG. 9 depicts the first light guide, and FIG. 10 depicts the second light guide.

Referring to FIGS. 7 and 8, the light irradiated from the light source 210 may be guided to the first light guide 221 and the second light guide 222. The first light guide 221 may include an incident surface 221a, a reflective surface 221b, and an emitting surface 221c. The incident surface 221a may receive the light from the light source 210. The light source 210 may be disposed adjacent to the incident surface 221a.

The reflective surface 221b may reflect the light incident from the light source 210 through the incident surface 221a. The reflective surface 221b may be formed to be inclined with respect to the optical axis Lx of the light source 210. Referring to FIGS. 7 and 8, the first light guide 221 may have a shape (e.g., a trapezoidal shape), in which the distance between the reflective surface 221b and the emitting surface 221c decreases as the distance from the light source 210 increases. In particular, the emitting surface 221c may be parallel to the optical axis Lx, and the reflective surface 221b may be formed to be inclined with respect to the optical axis Lx. Due to the shape of the first light guide 221 as described above, more light may reach the distal end of the first light guide 221 disposed opposite from the light source 210, compared to a configuration where both the reflective surface 221b and the emitting surface 221c are parallel with the optical axis Lx. Thus, more uniform amount of light may be emitted over the entire emitting surface 221c of the first light guide 221.

The emitting surface 221c may emit the light reflected by the reflective surface 221b. The second light guide 222 may be disposed adjacent to the emitting surface 221c of the first light guide 221. The wide surface (e.g., one of the major surfaces) of the emitting surface 221c and the wide surface of the second light guide 222 may be parallel to each other.

The emitting surface 221c may be formed by microprocessing. For example, the emitting surface 221c may be corroded to feature a finely roughened surface. As a result, the light reaching the emitting surface 221c may be diffused on the micro-processed surface, and may be more uniformly emitted over the entire emitting surface 221c. Here, the surface roughness over the entire emitting surface 221c may be uniform or may be different for different regions. For example, the surface roughness may increase or decrease progressively from the proximal end of the emitting surface 221c to the distal end.

A portion of the light irradiated from the light source 210 and directly reaching the emitting surface 221c may be transmitted to the second light guide 222. In addition, another portion of the light reaching the emitting surface 221c may be reflected to the reflective surface 221b. The reflective surface 221b may reflect the incident light. The light reflected by the reflective surface 221b may be transmitted through the emitting surface 221c to the second light guide 222, or may be reflected back from the emitting surface 221c to the reflective surface 221b. As this process is repeated, the light from the light source 210 may be transmitted to the second light guide 222 through the emitting surface 221c.

The first light guide 221 may include one or more diffuse reflecting feature 221d for diffuse reflecting the light incident from the light source 210. The diffuse reflecting feature 221d may be provided on the reflective surface 221b. Referring to FIG. 9, the diffuse reflecting feature 221d may have a spherical surface (i.e., a surface that constitutes at least a part of a putative sphere). The light incident to the diffuse reflecting feature 221d may be reflected in various directions by the diffuse reflecting feature 221d and be transmitted to the emitting surface 221c.

The first light guide 221 may include a plurality of diffuse reflecting features 221d. The plurality of diffuse reflecting features 221d may be formed in the first light guide 221 in a preset pattern. For example, the diffuse reflecting features 221d may be formed such that the density distribution increases or decreases progressively from the proximal end to the distal end of the reflective surface 221b of the first light guide 221. Alternatively, the plurality of diffuse reflecting features 221d may be formed on the reflective surface 221b to have a uniform density distribution or a non-uniform density distribution. Furthermore, since each of the diffuse reflecting features 221d having a spherical surface diffuses the light to the surroundings, the amount of light reaching the distal end of the first light guide 221 opposite from the light source 210 may be relatively increased, such that more uniform amount of light may be emitted over the entire emitting surface 221c of the first light guide 221.

In addition, the plurality of diffuse reflecting features 221d may be individually sized. For example, the sizes of the plurality of diffuse reflecting features 221d may be uniform, different from any other diffuse reflecting features 221d, or different from some diffuse reflecting features 221d.

Referring to FIGS. 8 and 10, the second light guide 222 may transmit the light incident from the first light guide 221. The second light guide 222 may include one or more total reflecting feature 222c. The total reflecting feature 222c may reflect the light incident from the first light guide 221. The total reflecting feature 222c may be formed on the light incident surface 222a of the second light guide 222.

The total reflecting feature 222c may be formed in the second light guide 222 such that its local reflective surfaces may be inclined with respect to the light emitting surface 222b of the second light guide 222. For example, the surface of the second light guide 222 may be cut in a "V" shape to form the total reflecting unit 222c.

The second light guide 222 may include a plurality of total reflecting features 222c. The plurality of total reflecting features 222c may be formed in the second light guide 222 in a preset pattern. For example, the total reflecting features 222c may be formed so that the density distribution increases or decreases progressively from the proximal end to the distal end of the light incident surface 222a of the second light guide 222. Alternatively, the plurality of total reflecting features 222c may be formed on the light incident surface 222a to have a uniform density distribution or a non-uniform density distribution. In addition, the plurality of total reflecting features 222c may have individual sizes and inclination angles. For example, sizes and/or inclination angles of the plurality of total reflecting features 222c may be uniform, different from any other total reflecting features 222c, or different from some total reflecting features 222c.

FIG. 10 illustrates the light being emitted through the second light guide. For example, the second light guide may emit the light such that the light density increases or decreases progressively from one side to the other, and may also emit the light in different directions.

Figure 11:
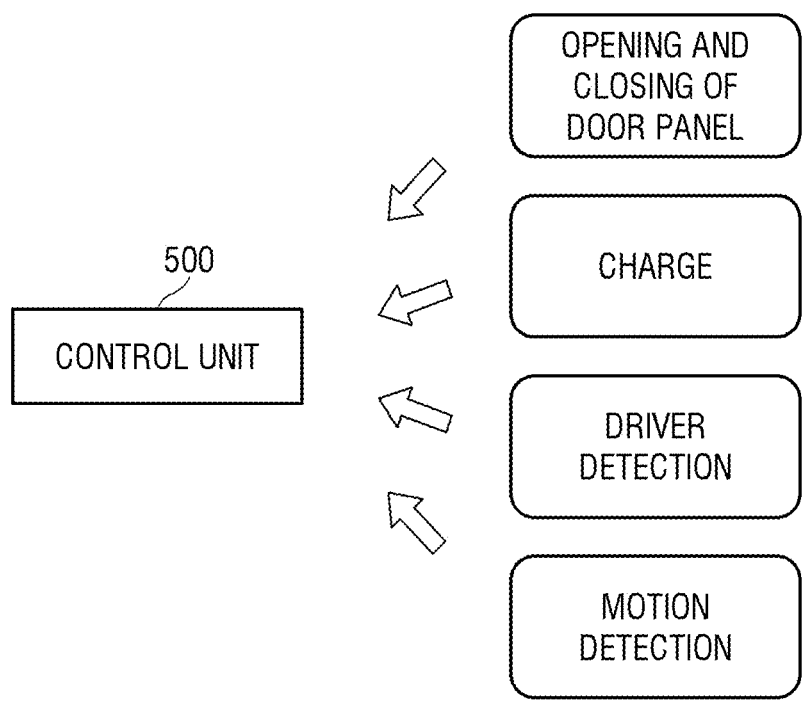
FIG. 11 is a diagram describing the operation of the controller according to an exemplary embodiment of the present disclosure.
Figure 12:
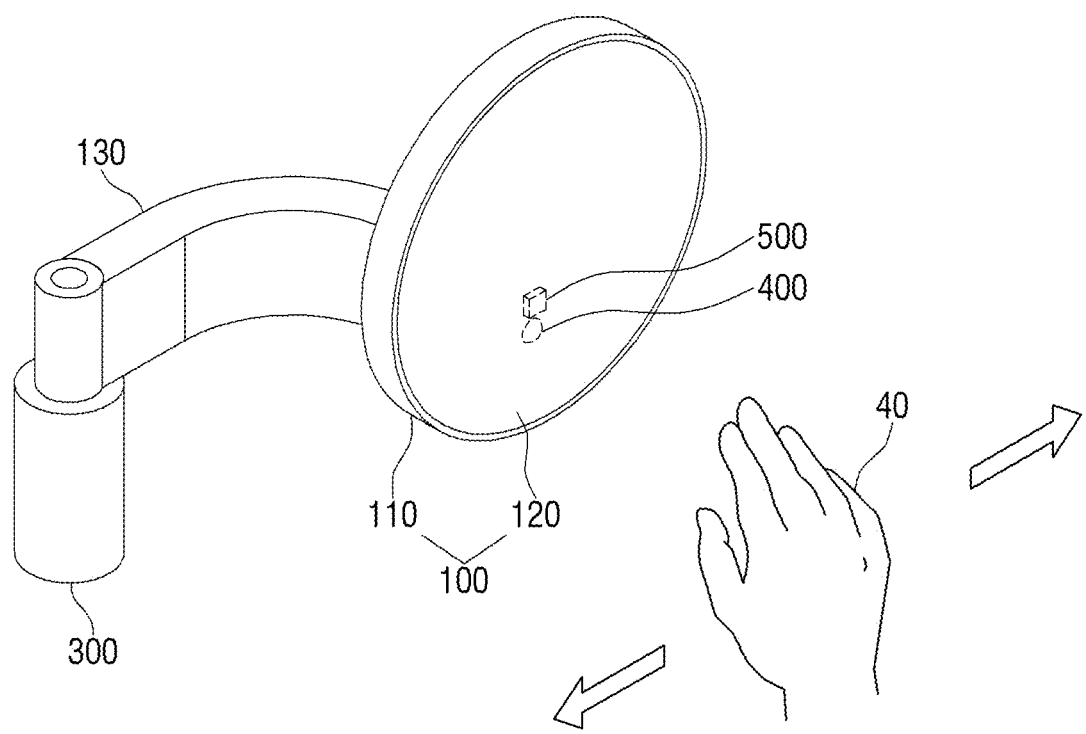
FIG. 12 shows the detection of motion of an external object by the motion detector according to an exemplary embodiment of the present disclosure.
Figure 13:
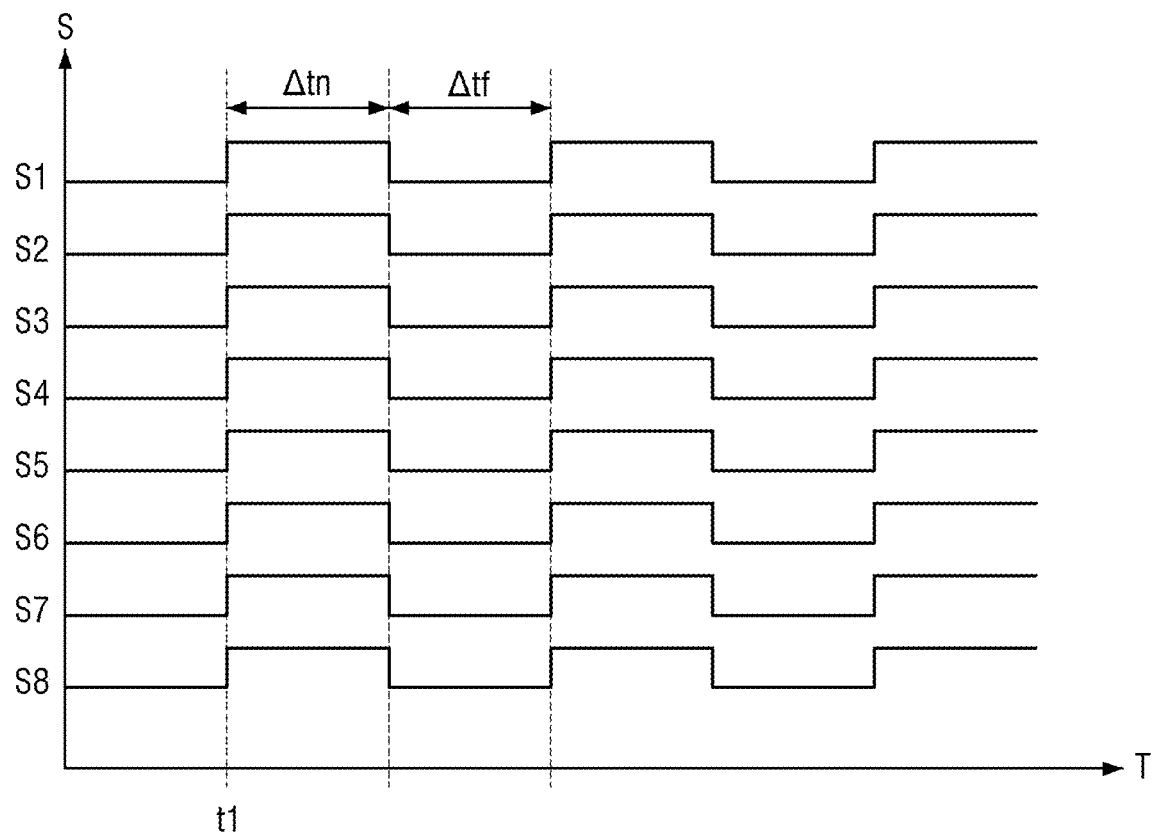
FIG. 13 depicts an operation example according to an exemplary embodiment of the present disclosure where a plurality of light sources are repeatedly turned on or turned off.
Figure 14:
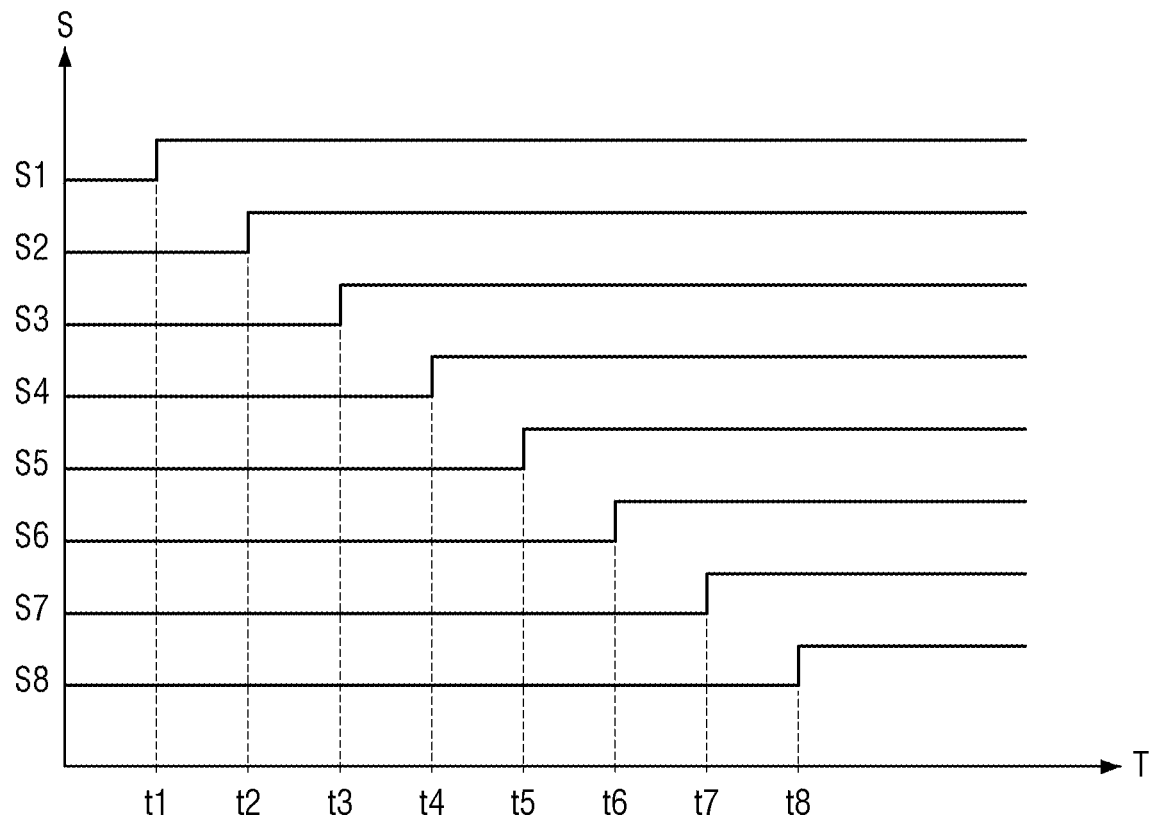

FIG. 11 is a diagram for describing the operation of the controller, FIG. 12 shows the detection of motion of an external object with the motion detector, FIG. 13 shows an operation example where a plurality of light sources are repeatedly turned on or turned off, and FIG. 14 shows an operation example where a plurality of light sources are sequentially turned on.

Referring to FIG. 11, the controller 500 may be configured to control the light source 210 in response to at least one of predetermined conditions being satisfied. The predetermined conditions may include the open/closed status of the door panel 100, the charging status via the charging port 30, the driving state of the vehicle, the detection of the driver, and the detection of motion of an external object.

By way of example, the controller 500 may be configured to control the light source 210 to be turned on or to flicker when the door panel 100 is opened or closed. The controller 500 may be configured to control the light source 210 to be turned on or to flicker when the battery starts to be charged, when the battery is in the middle of being charged, or when the charging is completed, through the charging port 30.

In addition, the controller 500 may be configured to control the light source 210 to be turned on or to flicker when the vehicle starts to be driven, when the vehicle is being driven, or when the driving is completed. Here, the completion of the driving may include a state, in which the vehicle is temporarily stopped, or parking is completed and the engine (and/or the motor) is turned off.

In addition, the controller 500 may be configured to control the light source 210 to be turned on or to flicker when it is detected that the driver approaches the vehicle. For example, when the driver approaches the vehicle with a smart key, the controller 500 may be configured to receive a signal indicating that the smart key approaches the vehicle from the vehicle system. In this case, the controller 500 may be configured to control the light source 210. In addition, the controller 500 may be configured to control the light source 210 to be turned on or to flicker when a motion of an external object is detected.

Referring to FIG. 12, a user (e.g., the driver) may move close to the door panel 100 and perform a motion. The motion detector 400 may detect the motion of an external object (e.g., the user, a body part of the user, etc.), and in response, the controller 500 may control the light source 210 and/or the actuator 300.

The controller 500 may be configured to control the light source 210 in response to motion patterns. For example, the user may move the hand 40 in an up-down direction, move the hand 40 in a left-right direction, or move the hand 40 in a specific pattern. The controller 500 may be configured to control the light source 210 depending on the motion pattern. Further, the controller 500 may be configured to control the actuator 300 to open or close the door panel 100 in response to a motion pattern designated for opening or closing the door panel 100 being input.

Referring to FIGS. 13 and 14, the plurality of light sources S1 to S8 may operate in a pattern based on a control command from the controller 500. The controller 500 may cause the plurality of light sources S1 to S8 to operate in a pattern corresponding to the various conditions described above.

As shown in FIG. 13, each of the light sources S1 to S8 may be repeatedly turned on and off at regular time intervals. For example, when a control command by the controller 500 is input at time t1, each of the light sources S1 to S8 may be repeatedly turned on and off. The time interval Δtn during which time the light is maintained on, and the time interval Δtf during which time the light is maintained off may be substantially same or different.

Meanwhile, although FIG. 13 shows that all of the light sources S1 to S8 are turned on and turned off simultaneously, the turning on and off of each of the light sources S1 to S8 may be sequentially performed. For example, the light sources may be turned on and turned off in a scanning manner with the order of S1→S2→S3→S4→S5→S6→S7→S8, or in the order of S8→S7→S6→S5→S4→S3→S2→S1, or in any other orders.

As shown in FIG. 14, the plurality of light sources S1 to S8 may be sequentially turned on. For example, when a control command by the controller 500 is input at time t1, the light may be turned on in the order of S1→S2→S3→S4→S5→S6→S7→S8 and be sustained. The time interval between the illumination of respective light sources S1 to S8 may be substantially same or different.

In addition, the light sources may be turned on in the order of S8→S7→S6→S5→S4→S3→S2→S1. Alternatively, the plurality of light sources may be divided into groups, and each group may be turned on in the order of (S1, S2)→(S3, S4)→(S5, S6)→(S7, S8). However, the present disclosure is not limited thereto, and any other orders and any other groupings are also possible.

The light sources S1 to S8 may be turned off in the same order, in which they are turned on, or may be turned off in the reverse order. Alternatively, after all of the plurality of light sources S1 to S8 are turned on, all of the light sources S1 to S8 may be turned off simultaneously.

Although the exemplary embodiments of the present disclosure have been described above with reference to the accompanying drawings, those of ordinary skill in the art, to which the present disclosure pertains, may understand that the present disclosure may be implemented in other forms without changing the technical spirit or essential features. Therefore, it should be understood that the exemplary embodiments described above are illustrative only and non-limiting in any aspect.

What is claimed is:

1. A charging port door comprising:
    a door panel for opening and closing a charging housing that accommodates a charging port therein;
    an optical unit included within the door panel for irradiating light to an exterior of the door panel; and
    a controller for controlling the optical unit,
    wherein the controller is configured to control the optical unit in response to a predetermined condition being satisfied,
    wherein the optical unit comprises:
        a light source for irradiating the light; and
        a light guide for guiding the light from the light source to the exterior of the door panel, and
    wherein the light guide comprises:
        a first light guide for diffusing the light incident from the light source; and
        a second light guide for emitting the light incident from the first light guide in a preset pattern.

2. The charging port door of claim 1, wherein the predetermined condition includes at least one of open/closed status of the door panel, charging status, driving state of a vehicle, detection of a driver, or detection of a motion of an external object.

3. The charging port door of claim 1, wherein the door panel comprises:
    a main panel including an accommodating space for the optical unit; and
    a panel cover coupled to the main panel for sealing the accommodating space for the optical unit, and for transmitting the light from the optical unit to form a predetermined light pattern.

4. The charging port door of claim 1, wherein the first light guide comprises:
    an incident surface for receiving the light from the light source;
    a reflective surface for reflecting the light incident from the light source; and
    an emitting surface for emitting the light reflected by the reflective surface,
    wherein the reflective surface is formed to be inclined with respect to an optical axis of the light source.

5. The charging port door of claim 4, wherein the emitting surface is formed by micro-processing.

6. The charging port door of claim 1, wherein the first light guide comprises one or more diffuse reflecting feature for diffuse reflecting the light incident from the light source, and
    wherein the diffuse reflecting feature has a spherical surface.

7. The charging port door of claim 6, wherein the first light guide comprises a plurality of diffuse reflecting features, and
wherein the plurality of diffuse reflecting features are formed in the first light guide in a preset pattern.

8. The charging port door of claim 6, wherein the first light guide comprises a plurality of diffuse reflecting features, and
wherein at least some of the plurality of diffuse reflecting features exhibit different sizes.

9. The charging port door of claim 1, wherein the second light guide comprises one or more total reflecting feature for reflecting the light incident from the first light guide, and
wherein the total reflecting feature is formed in the second light guide so that a local reflective surface of the total reflecting feature is inclined with respect to a light emitting surface of the second light guide.

10. The charging port door of claim 9, wherein the second light guide comprises a plurality of total reflecting features, and
wherein the plurality of total reflecting features are formed in the second light guide in a preset pattern.

11. The charging port door of claim 1, wherein the optical unit comprises a plurality of light sources, and
wherein the controller is configured to control the plurality of light sources to be turned on or turned off in a preset pattern.

12. A charging port door comprising:
a door panel for opening and closing a charging housing that accommodates a charging port therein;
an optical unit included within the door panel for irradiating light to an exterior of the door panel; and
a controller for controlling the optical unit,
wherein the controller is configured to control the optical unit in response to a predetermined condition being satisfied,
wherein the door panel comprises:
a main panel including an accommodating space for the optical unit; and
a panel cover coupled to the main panel for sealing the accommodating space for the optical unit, and for transmitting the light from the optical unit to form a predetermined light pattern,
wherein the panel cover comprises:
a cover body including a substantially transparent material;
a paint layer disposed on a surface of the cover body; and
a coating layer formed by applying a transparent coating material on a surface of the paint layer, and
wherein the paint layer comprises a preset light transmission pattern.

13. The charging port door of claim 12, wherein the optical unit comprises:
a light source for irradiating the light; and
a light guide for guiding the light from the light source to the exterior of the door panel.

14. The charging port door of claim 13, wherein the light guide comprises:
a first light guide for diffusing the light incident from the light source; and
a second light guide for emitting the light incident from the first light guide in a preset pattern.

15. A charging port door comprising:
a door panel for opening and closing a charging housing that accommodates a charging port therein;
an optical unit included within the door panel for irradiating light to an exterior of the door panel;
a controller for controlling the optical unit; and
a motion detector,
wherein the controller is configured to control the optical unit in response to a predetermined condition being satisfied, and
wherein the at least one predetermined condition includes detection of a motion of an external object, and the motion detector is configured for detecting the motion of the external object present, if any, outside the door panel.

16. The charging port door of claim 15, wherein the optical unit comprises a plurality of light sources, and
wherein the controller is configured to control the plurality of light sources to be turned on or turned off in a pattern corresponding to different motions of the external object.

17. The charging port door of claim 15, further comprising:
an actuator for generating a driving force for opening and closing the door panel,
wherein the controller is configured to control the actuator based on the motion of the external object.

* * * * *